US008060477B1

(12) United States Patent
Svendsen (10) Patent No.: US 8,060,477 B1
(45) Date of Patent: Nov. 15, 2011

(54) SYSTEM AND METHOD FOR ARCHIVING A MEDIA COLLECTION

(75) Inventor: Hugh Svendsen, Chapel Hill, NC (US)

(73) Assignee: Abo Enterprises, LLC, Wilmington, DE (US)

( * ) Notice: Subject to any disclaimer, the term of this patent is extended or adjusted under 35 U.S.C. 154(b) by 0 days.

(21) Appl. No.: 12/821,363

(22) Filed: Jun. 23, 2010

Related U.S. Application Data (63) Continuation of application No. 11/392,051, filed on Mar. 29, 2006, now Pat. No. 7,765,192.

(51) Int. Cl.
*G06F 7/00* (2006.01)
*G06F 17/00* (2006.01)

(52) U.S. Cl. .......................... 707/653; 707/916
(58) Field of Classification Search .................. None
See application file for complete search history.

(56) References Cited

U.S. PATENT DOCUMENTS

| | | | |
|---|---|---|---|
| 5,765,028 A | 6/1998 | Gladden |
| 5,864,854 A | 1/1999 | Boyle |
| 5,878,218 A | 3/1999 | Maddalozzo et al. |
| 5,884,031 A | 3/1999 | Ice |
| 5,946,464 A | 8/1999 | Kito et al. |
| 6,003,030 A | 12/1999 | Kenner |
| 6,012,083 A | 1/2000 | Savitzky et al. |
| 6,049,821 A | 4/2000 | Theriault et al. |
| 6,141,759 A | 10/2000 | Braddy |
| 6,212,520 B1 | 4/2001 | Maruyama et al. |
| 6,216,151 B1 | 4/2001 | Antoun |
| 6,253,234 B1 | 6/2001 | Hunt et al. |
| 6,336,115 B1 | 1/2002 | Tominaga et al. |
| 6,374,289 B2 | 4/2002 | Delaney et al. |
| 6,490,625 B1 | 12/2002 | Islam et al. |
| 6,507,727 B1 | 1/2003 | Henrick |
| 6,633,901 B1 | 10/2003 | Zuili |
| 6,728,729 B1 | 4/2004 | Jawa et al. |

(Continued)

FOREIGN PATENT DOCUMENTS

GB 2372850 A 9/2002

(Continued)

OTHER PUBLICATIONS

"Acoustic fingerprint," http://en.wikipedia.org/wiki/Acoustic_fingerprint, printed Jul. 3, 2009, 3 pages.

(Continued)

*Primary Examiner* — Pierre Vital
*Assistant Examiner* — Jason Liao
(74) *Attorney, Agent, or Firm* — Withrow & Terranova, PLLC (57) ABSTRACT

A system and method for archiving a user's media collection are provided. In general, a central archiving system stores high-quality versions of a number of known media files and a number of known encoding algorithms. First, each media file in the user's media collection and an encoding algorithm used to encode each media file are classified as either known or unknown to the archiving server. For each known media file encoded with a known encoding algorithm, the archive includes information identifying the media file, information identifying the encoding algorithm for the media file, and optionally the one or more quality parameters such as bit rate, sampling frequency, and the like for the media file. For each unknown media file and/or media file encoded with an unknown CODEC or encoding algorithm, the archive includes the media file, which is uploaded and stored at the archiving system.

16 Claims, 8 Drawing Sheets

U.S. PATENT DOCUMENTS

| | | | |
|---|---|---|---|
| 6,807,641 | B1 | 10/2004 | Ishiguro et al. |
| 6,941,275 | B1 | 9/2005 | Swierczek |
| 6,985,588 | B1 | 1/2006 | Glick et al. |
| 6,990,453 | B2 | 1/2006 | Wang et al. |
| 7,069,310 | B1 | 6/2006 | Bartholomew |
| 7,194,555 | B2 | 3/2007 | Scibora |
| 7,203,711 | B2 | 4/2007 | Borden et al. |
| 7,277,766 | B1 | 10/2007 | Khan et al. |
| 7,310,629 | B1 | 12/2007 | Mendelson et al. |
| 7,542,992 | B1 * | 6/2009 | Pandurangan et al. ............... 1/1 |
| 7,668,821 | B1 | 2/2010 | Donsbach et al. |
| 2001/0051996 | A1 | 12/2001 | Cooper |
| 2002/0025141 | A1 | 2/2002 | Matsumoto et al. |
| 2002/0033844 | A1 | 3/2002 | Levy et al. |
| 2002/0052885 | A1 | 5/2002 | Levy |
| 2002/0065074 | A1 | 5/2002 | Cohn |
| 2002/0152318 | A1 | 10/2002 | Menon et al. |
| 2002/0152396 | A1 | 10/2002 | Fox et al. |
| 2002/0156546 | A1 | 10/2002 | Ramaswamy |
| 2002/0157002 | A1 | 10/2002 | Messerges et al. |
| 2002/0194264 | A1 | 12/2002 | Uchiyama et al. |
| 2003/0023427 | A1 | 1/2003 | Cassin et al. |
| 2003/0055657 | A1 | 3/2003 | Yoshida et al. |
| 2003/0206717 | A1 * | 11/2003 | Yogeshwar et al. ............ 386/69 |
| 2004/0034441 | A1 | 2/2004 | Eaton |
| 2004/0057348 | A1 | 3/2004 | Shteyn |
| 2004/0064500 | A1 | 4/2004 | Kolar et al. |
| 2004/0088348 | A1 | 5/2004 | Yeager et al. |
| 2004/0096110 | A1 | 5/2004 | Yogeshwar et al. |
| 2004/0117828 | A1 | 6/2004 | Parker et al. |
| 2004/0158865 | A1 | 8/2004 | Kubler et al. |
| 2004/0224638 | A1 | 11/2004 | Fadell et al. |
| 2005/0010616 | A1 | 1/2005 | Burks |
| 2005/0015713 | A1 | 1/2005 | Plastina et al. |
| 2005/0021420 | A1 | 1/2005 | Michelitsch et al. |
| 2005/0026559 | A1 | 2/2005 | Khedouri |
| 2005/0108303 | A1 | 5/2005 | Carter |
| 2005/0119977 | A1 | 6/2005 | Raciborski |
| 2005/0154764 | A1 | 7/2005 | Riegler |
| 2005/0216855 | A1 | 9/2005 | Kopra et al. |
| 2005/0240494 | A1 | 10/2005 | Cue et al. |
| 2005/0251576 | A1 | 11/2005 | Weel |
| 2005/0273825 | A1 | 12/2005 | Eldeeb |
| 2006/0004640 | A1 | 1/2006 | Swierczek |
| 2006/0008256 | A1 | 1/2006 | Khedouri et al. |
| 2006/0159109 | A1 | 7/2006 | Lamkin et al. |
| 2006/0161635 | A1 | 7/2006 | Lamkin et al. |
| 2006/0168351 | A1 | 7/2006 | Ng et al. |
| 2006/0195462 | A1 | 8/2006 | Rogers |
| 2006/0195515 | A1 | 8/2006 | Beaupre et al. |
| 2007/0005990 | A1 | 1/2007 | Sathish |
| 2007/0168540 | A1 | 7/2007 | Hansson |
| 2007/0198746 | A1 | 8/2007 | Myllyla et al. |
| 2008/0010372 | A1 | 1/2008 | Khedouri et al. |
| 2008/0086750 | A1 | 4/2008 | Yasrebi et al. |
| 2008/0104111 | A1 | 5/2008 | Slaney |
| 2008/0162655 | A1 | 7/2008 | Khedouri et al. |
| 2008/0183794 | A1 | 7/2008 | Georgis et al. |

FOREIGN PATENT DOCUMENTS

| | | |
|---|---|---|
| WO | 00/54462 A1 | 9/2000 |
| WO | 01/02905 A1 | 1/2001 |
| WO | 2006/093839 A2 | 9/2006 |

OTHER PUBLICATIONS

"Apple—iTunes—Music Store," http://web.archive.org/web/20050305041722/www.apple.com/itunes/store/, copyright 2005 Apple Computer, Inc., printed Dec. 7, 2008, 3 pages.

Tony Bowden, "Understanding Nothing, The Music Database: Prehistory," Jun. 25, 2002, http://nothing.tmtm.com/archives/tag/mdb/page/2, printed Jul. 3, 2009, 6 pages.

Rocco Caputo, "CDDB.pm," http://www.mathematik.uni-ulm.de/help/per15/doc-5.005_CDDB.html, copyright 1998 Rocco Caputo, printed Jul. 3, 2009, 6 pages.

"Discover music with a little help from the fans," http://www.last.fm/tour/discover/, copyright 2002-2007 Last.fm Ltd., printed Oct. 4, 2007, 1 page.

Lucas Gonze, "A survey of playlist formats," http://gonze.com/playlists/playlist-format-survey.html, Nov. 17, 2003, printed Dec. 7, 2008, 22 pages.

"Listen with Last.fm and fuel the social music revolution," http://www.last.fm/tour/, copyright 2002-2007 Last.fm Ltd., printed Oct. 4, 2007, 1 page.

"The Mp3/Tag Studio Homepage," http://www.magnusbrading.com/mp3ts/, printed May 17, 2007, 1 page.

"Musicstrands.com Because Music is Social," copyright 2006 MusicStrands, Inc., 2 pages.

"Share your music taste," http://www.last.fm/tour/share/, copyright 2002-2007 Last.fm Ltd., printed Oct. 4, 2007, 1 page.

"Start listening with Last.fm . . . and get a station with music you'll like," http://www.last.fm/, copyright 2002-2007 Last.fm Ltd., printed Oct. 4, 2007, 2 pages.

"Tag&Rename—easy to use mp3 tag editor," http://www.softpointer.com/tr.htm, copyright 1999-2007 Softpointer Inc, printed May 17, 2007, 2 pages.

* cited by examiner

SYSTEM AND METHOD FOR ARCHIVING A MEDIA COLLECTION

CROSS-REFERENCE TO RELATED APPLICATIONS

This patent application is a continuation of U.S. patent application Ser. No. 11/392,051, filed Mar. 29, 2006, entitled "SYSTEM AND METHOD FOR ARCHIVING A MEDIA COLLECTION," the disclosure of which is hereby incorporated herein by reference in its entirety.

FIELD OF THE INVENTION

The present invention relates to a system and method for archiving a user's media collection.

BACKGROUND OF THE INVENTION

Over the past several years, mobile audio players have become commonplace. To supply audio content for these devices, users typically "rip" songs from purchased compact discs (CDs) and purchase songs from online services such as Apple's iTunes. When combined with the massive storage devices available in today's marketplace, these mobile audio players and the ability to obtain digital audio content have resulted in user music collections occupying tens if not hundreds of Gigabytes of storage space. As a result, conventional techniques for archiving a user's music collection, such as copying the music collection to a Digital Video Disc (DVD), have become inadequate in many cases. Further, if the user's music collection is destroyed by, for example, a failure of a hard-disc drive on which the music collection is stored, the user may lack the time or means to recreate his or her music collection from purchased CDs or online services. Thus, there remains a need for a system and method for efficiently and effectively archiving a user's music collection.

SUMMARY OF THE INVENTION

The present invention provides a system and method for archiving a user's media collection, which resides on a user system. The user's media collection includes a number of media files including media content, such as a song, video, or the like, encoded with an encoding algorithm for the purpose of reducing storage and transmission requirements. In general, an archiving system operates to archive the user's media collection by storing information identifying the media content and information identifying the encoding algorithm for the media files rather than the actual media files. Thereafter, the media files in the user's media collection may be recreated using reference media files corresponding to the identified media content and encoding algorithms corresponding to the identified encoding algorithms.

In addition, the user's media collection may include a number of unique media files. A unique media file is a media file having unknown media content or media content encoded with an unknown encoding algorithm. Media content is known to the archiving system if a reference media file corresponding to the media content is stored by the archiving system. An encoding algorithm is known to the archiving system if the encoding algorithm is available for execution, or otherwise known, by the archiving system. The archiving system operates to archive the unique media files by uploading the unique media files from the user system and storing the unique media files in association with the archive record for the user's media collection.

In operation, the user system provides identification parameters, information identifying the encoding algorithm, and optionally one or more quality parameters for each media file in the user's media collection to the archiving system. The identification parameters generally identify the media content of the media files and may include one or more fingerprints of the media content, one or more samples of the media content, metadata describing the media content from the media file, a filename of the media file, a directory name in which the media file is stored, and the like. Based on the identification parameters and the information identifying the encoding algorithm for each media file in the user's media collection, the archiving system identifies unique media files in the user's media collection. For non-unique media files, the archive record is generated to store information identifying the media content, such as a Globally Unique Identifier (GUID), information identifying the encoding algorithm for each of the non-unique media files, and optimally the one or more quality parameters. The unique media files are uploaded from the user system and stored at the central system in association with the archive record for the user's media collection. As a result, both unique and non-unique media files from the user's media collection are archived at the archiving system.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention provides a system and method for archiving a user's media collection, which resides on a user system. The user's media collection includes a number of media files including media content, such as a song, video, or the like, encoded with an encoding algorithm. In general, an archiving system operates to archive the user's media collection by storing information identifying the media content and information identifying the encoding algorithm for the media files rather than the actual media files. Thereafter, the media files in the user's media collection may be recreated using reference media files corresponding to the identified media content and encoding algorithms corresponding to the identified encoding algorithms.

In addition, the user's media collection may include a number of unique media files. A unique media file is a media file having unknown media content or media content encoded with an unknown encoding algorithm. Media content is known to the archiving system if a reference media file corresponding to the media content is stored by the archiving system. An encoding algorithm is known to the archiving system if the encoding algorithm is available for execution, or otherwise known, by the archiving system. The archiving system operates to archive the unique media files by uploading the unique media files from the user system and storing the unique media files in association with the archive record for the user's media collection.

Figure 1:
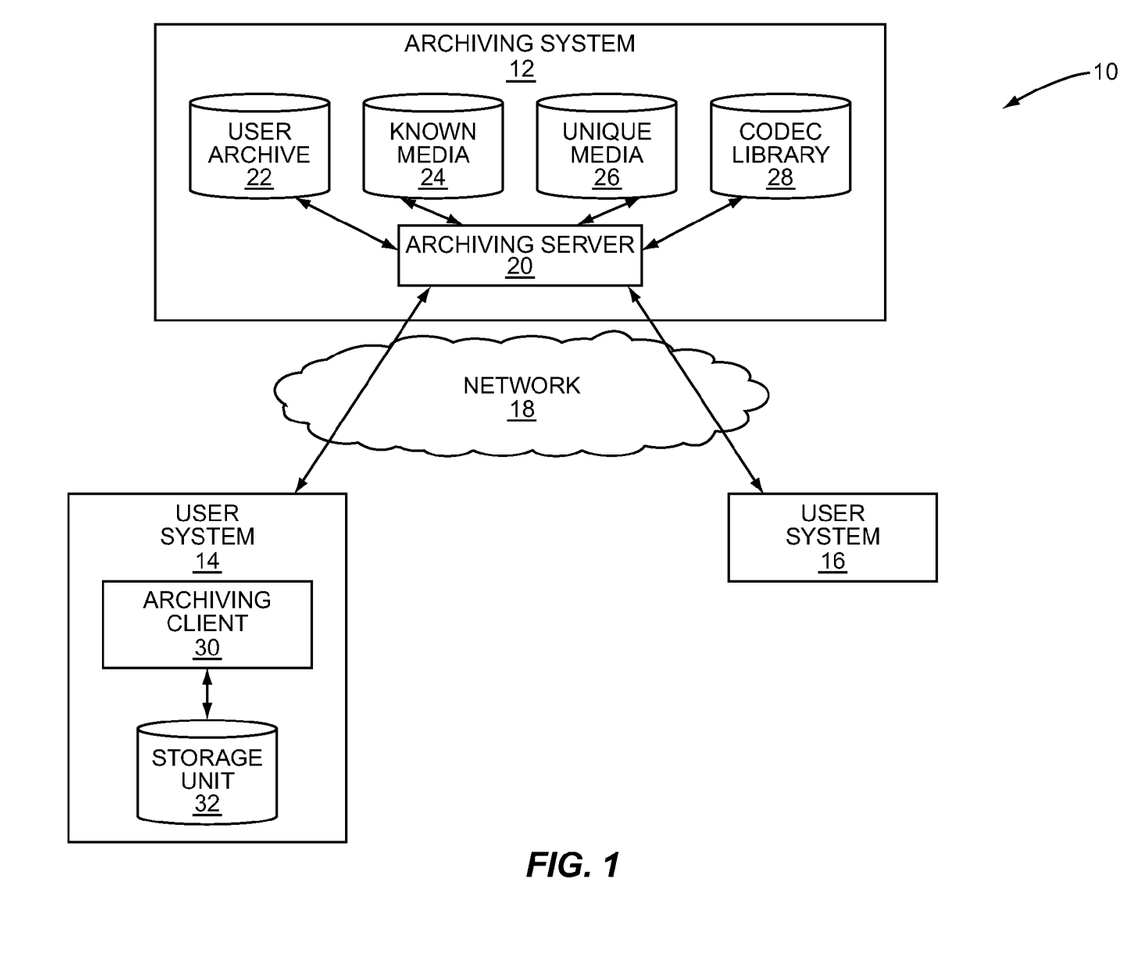
FIG. 1 illustrates a system for archiving a user's media collection according to one embodiment of the present invention.

FIG. 1 illustrates a system 10 for archiving a user's media collection according to one embodiment of the present invention. In general, the system 10 includes an archiving system 12 and a number of user systems 14 and 16 communicatively coupled by a network 18, which is preferably the Internet. The archiving system 12 includes an archiving server 20 and a number of databases 22-28. The archiving server 20 may be implemented in hardware, software, or a combination of hardware and software. In addition, although the archiving server 20 is illustrated as a single block, the archiving server 20 may be implemented as a single server or a number of distributed servers. As discussed below in detail, the archiving server 20 operates to archive media collections residing on the user systems 14 and 16.

The databases 22-28 include a user archive database 22, a known media database 24, a unique media database 26, and a Coding-Decoding (CODEC) library 28. While the databases 22-28 are illustrated as separate databases, the databases 22-28 may be implemented in one or more storage units, such as, but not limited to, one or more hard-disc drives. The user archive database 22 operates to store archives of the media collections residing on the user systems 14, 16. In this example, for each of the user systems 14 and 16, the user archive database 22 stores a user archive record operating as an archive of the user's media collection.

In one embodiment, for each non-unique media file in a media collection, the user archive record includes a Globally Unique Identifier (GUID) identifying the media content of the media file, CODEC information identifying a CODEC or encoding algorithm used to encode the media content, and optionally one or more quality parameters. The quality parameters vary depending on the particular CODEC or encoding algorithm for the media file. For example, if a particular media file in the user's media collection is a song encoded in the Moving Pictures Expert Group (MPEG) Audio Layer 3 (MP3) format, the quality parameters may include bit rate and sampling frequency.

For each unique media file in the media collection, the archive record includes a reference to the unique media file, where the unique media file has been uploaded from the user system 14 and stored in the unique media database 26. A unique media file is a media file including media content that is unknown to the archiving server 20, a media file having media content encoded with a CODEC or encoding algorithm that is unknown to the archiving server 20, or a media file including media content that is both unknown to the archiving server 20 and encoded with a CODEC or encoding algorithm that is unknown to the archiving server 20. In addition, for each unique media file, the user archive record may include one or more identification parameters and information identifying the CODEC or encoding algorithm for the media file. As discussed below, the identification parameters and information identifying the CODEC or encoding algorithm for the media file may be used by the archiving server 20 to identify the media content of the media file and the CODEC or encoding algorithm as new media content and CODECs or encoding algorithms become known to the archiving server 20.

The known media database 24 operates to store high-quality reference media files corresponding to media content such as a number of songs, movies, television programs, or the like. The media files stored in the known media database 24 may be CD or DVD quality or better and may be stored in either an uncompressed format or a lossless compression format. The media files in the known media database 24 may be obtained, for example, from an original source such as, but not limited to, an original CD or DVD, an Internet service such as Apple's iTunes, or the like. In addition, the known media database 24 may store metadata and one or more fingerprints describing the media content for each media file in the known media database 24. For example, for a song, the metadata may include, but is not limited to, genre, artist, album, song title, year released, lyrics, image of the album cover, and the like.

The unique media database 26 operates to store binary files corresponding to media files in media collections archived by the archiving systems 12 that are unique to the archiving server 20. As used herein, a media file is unique when the media content of the media file is unknown to the archiving server 20, when the media content in the media file is encoded with a CODEC or encoding algorithm that is not known to the archiving server 20, or when the media content of the media file is unknown to the archiving server 20 and encoded with a CODEC or encoding algorithm that is unknown to the archiving server 20. The media content of a media file is unknown to the archiving server 20 when a high-quality reference media file corresponding to the media content is not stored in the known media database 24. A CODEC or encoding algorithm is unknown to the archiving server 20 when the CODEC or encoding algorithm is not stored in the CODEC library 28 or is not otherwise available for execution. In one embodiment, the CODEC library 28 stores a number of known CODECs or encoding algorithms. In another embodiment, the CODEC library 28 stores information identifying a number of CODECs or encoding algorithms available for execution by the archiving server 20. As discussed below, when the archiving system 12 restores a user's media collection, non-unique media files in the user's media collection can be recreated by the archiving server 20 based on corresponding high-quality reference media files stored in the known media database 24 and associated CODECs or encoding algorithms from the CODEC library 28.

The following discussion of the user system 14 is equally applicable to the user system 16. The user system 14 may generally be any user device or combination of devices used to store a user's media collection and that has a connection to the network 18. For example, the user system 14 may be a personal computer. The user system 14 includes an archiving client 30 and a storage unit 32. The archiving client 30 is preferably implemented in software, but is not limited thereto. As discussed below in detail, the archiving client 30 operates to discover the user's media collection stored in the storage unit 32 and interact with the archiving server 20 to archive the user's media collection. The storage unit 32 may be any type of storage device such as, but not limited to, a hard-disc drive and operates to store a number of audio files, video files, or both audio and video files corresponding to the media files in the user's media collection.

Figure 2:
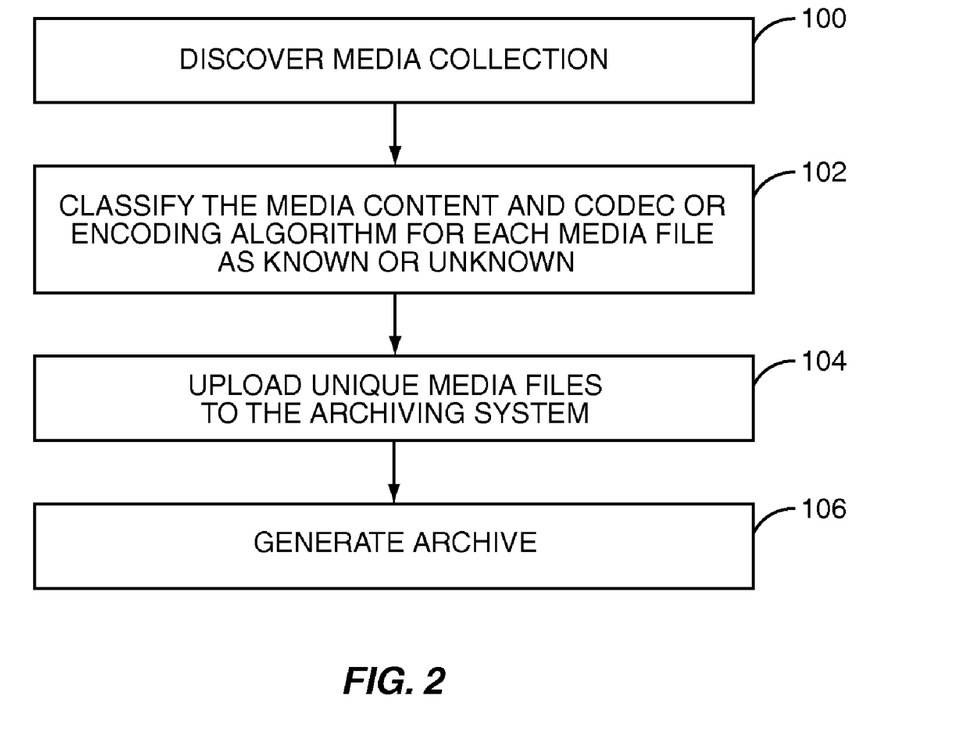
FIG. 2 illustrates the operation of the system of FIG. 1 according to one embodiment of the present invention.

FIG. 2 illustrates the operation of the system 10 of FIG. 1 to archive the user's media collection stored in the storage unit 32 of the user system 14 according to one embodiment of the present invention. First, the archiving client 30 operates to discover the user's media collection stored in the storage unit 32 (step 100). The archiving client 30 may discover the user's media collection by scanning the storage unit 32 for song files, video files, or both song files and video files forming the user's media collection. For example, if the storage unit 32 is a hard-disc drive having a file system including a number of directories, the archiving client 30 may scan all directories or directories selected by the user to discover the media files in the user's media collection.

At this point, the archiving client 30 and the archiving server 20 operate together to classify the media content and CODEC or encoding algorithm for each media file in the user's media collection either known or unknown (step 102). More specifically, as discussed below in detail, the archiving client 30 provides one or more identification parameters for each of the media files to the archiving server 20. Based on the identification parameters, the archiving server 20 classifies the media content for each media file as either known or unknown. Known media content is a media content which is known by the archiving server 20. More specifically, media content is known to the archiving server 20 if a high-quality reference media file corresponding to the media content is stored in the known media database 24. In addition, the CODEC or encoding algorithm for each media file is classified as known or unknown by determining whether the CODEC or encoding algorithm is stored in the CODEC library 28 or otherwise available for execution by the archiving server 20.

The identification parameters provided to the archiving server 20 and used to classify the media content of the media files in the user's media collection as either known or unknown may vary. As discussed below with respect to FIGS. 3-6, in a first embodiment, the identification parameters include one or more fingerprints for the media content of each media file in the user's media collection. In a second embodiment, the identification parameters include one or more samples of the media content of each media file in the user's media collection, rather than fingerprints. In a third embodiment, the identification parameters include metadata describing the media content of each media file in the collection and fingerprints for the media content of a select number of the media files. In a fourth embodiment, the identification parameters include metadata describing the media content of each media file in the collection and one or more samples of the media content of a select number of the media files.

Once the media content and the associated CODECs or encoding algorithms for the media files in the user's media collection are classified as known or unknown, unique media files are identified and uploaded from the user system 14 to the archiving system 12 (step 104). Once uploaded, the unique media files are stored in the unique media database 26. A unique media file is a media file having media content that is unknown to the archiving server 20, media content that is encoded using a CODEC or encoding algorithm that is unknown to the archiving server 20, or media content both unknown to the archiving server 20 and encoded using CODEC or encoding algorithm that is unknown to the archiving server 20.

At this point, the archive of the user's media collection may be generated (step 106). More specifically, in one embodiment, a user archive record is generated. For each media file in the user's media collection that includes known media content encoded with a known CODEC or encoding algorithm, the archive record includes information identifying the media content of the media file, such as a GUID of the song or video, CODEC information identifying the CODEC or encoding algorithm for the media file, and optionally one or more quality parameters. In addition, the archive record may include metadata describing the media content. The quality parameters are parameters such as, but not limited to, bit rate and sampling frequency. The quality parameters may be desired to ensure that when the user's media collection is restored by the archiving system 12, the copies of the media files provided to the user system 14 are substantially, if not exactly, the same as the media files originally in the user's media collection. In addition, the quality parameters ensure that a user does not obtain a higher or lower quality version of a media file than he or she originally had in his or her media collection.

For each unique media file in the user's media collection, the user archive record includes a reference to the unique media file, which has been uploaded and stored in the unique media database 26. Alternatively, the unique media file may be stored within the archive record. In addition, the archive record may include identification parameters such as one or more fingerprints for the each of the unique media files, information identifying the CODEC or encoding algorithm for each of the unique media files, and optionally one or more quality parameters for each of the unique media files. The identification parameters and the information identifying the CODEC or encoding algorithm may thereafter be used by the archiving server 20 to determine whether to reclassify the unique media file as a non-unique media file when a new media file is added to the known media database 24 or a new CODEC or encoding algorithm is added to the CODEC library 28.

Figure 3:
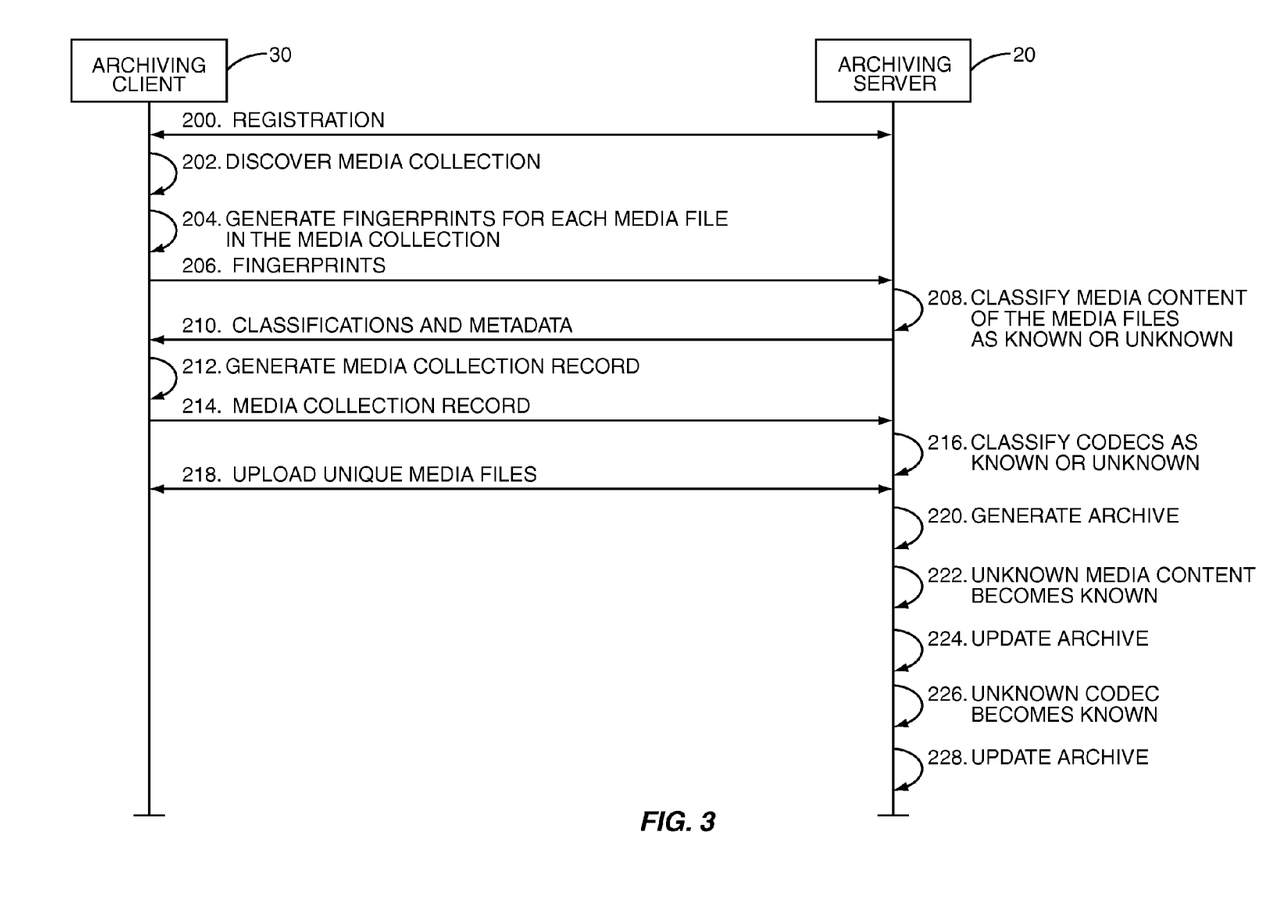
FIG. 3 is a more detailed illustration of the operation of the system of FIG. 1 according to a first embodiment of the present invention.

FIG. 3 is a more detailed illustration of the operation of the system 10 of FIG. 1 according to a first embodiment of the present invention. First, the archiving client 30 interacts with the archiving server 20 to register a user of the user system 14 with the archiving system 12 (step 200). Registration may include providing information identifying the user to the archiving system 12. The information identifying the user may include, for example, the name of the user, home address, telephone number, email address, and the like. In addition, the user may be asked to enter demographic information such as, for example, age, sex, and marital status, and various user preferences such as, for example, favorite music genre, favorite music artist, or the like. Next, the archiving client 30 discovers the user's media collection (step 202). More specifically, the archiving client 30 may scan the storage unit 32 to discover the media files in the user's media collection.

In this embodiment, the archiving client 30 then generates one or more fingerprints for each media file in the user's media collection (step 204). In general, for each media file, the archiving client 30 analyzes one or more segments of the media content of the media file to determine, for example, beats-per-minute and/or compute a Fast Fourier Transform (FFT), thereby providing fingerprints for the media file. The segments of the media content of the media file analyzed to generate the fingerprints may be selected at random. For a more detailed discussion of generating fingerprints for a song and identifying the song based on the fingerprints, see U.S. Pat. No. 6,990,453, entitled SYSTEM AND METHODS FOR RECOGNIZING SOUND AND MUSIC SIGNALS IN HIGH NOISE AND DISTORTION, issued Jan. 24, 2006, which is hereby incorporated by reference in its entirety.

Once the fingerprints are generated, the archiving client 30 provides the fingerprints for each media file in the user's media collection to the archiving server 20 (step 206). The fingerprints for the media files may be provided immediately after they are generated, periodically in a batch process, or once after all of the fingerprints for the media files in the user's media collection are generated.

Using the fingerprints, the archiving server 20 classifies the media content of each media file in the user's media collection as either known or unknown (step 208). More specifically, for each of the media files in the user's media collection, the archiving server 20 compares the fingerprints of the media file to fingerprints of the media files stored in the known media database 24 to determine whether the media content of the media file corresponds to the media content of one of the media files stored in the known media database 24. The fingerprints of the media files stored in the known media database 24 may be generated by the archiving server 20 when the media files are initially added to the known media database 24 and stored in the known media database 24. Based on the comparisons of the fingerprints of the media files in the user's media collection and the fingerprints of the media files stored in the known media database 24, the archiving server 20 classifies the media content of each media file in the user's media collection as either known or unknown.

The archiving server 20 then returns the classification of the media content of each of the media files in the user's media collection to the archiving client 30 (step 210). In addition to the classification for each of the media files, a GUID for each media file having known media content may also be provided. As stated above, the GUID is a global identifier that identifies the media content of the media file. Optionally, the archiving server 20 may additionally return the metadata for the media files in the user's media collection. As an example, for a song, the metadata may include information such as, but not limited to, artist, album, title, genre, year released, lyrics, image of the album cover, and the like. The metadata may be obtained from the headers of the media files stored in the known media database 24 or obtained from a third party source such as, but not limited to, Gracenotes or Musicbrainz. Once the metadata is received by the archiving client 30, the archiving client 30, or an associated application, may store the metadata for each of the associated media files in the headers of the associated media files or correct the metadata already stored in the headers of the associated media files. For example, if a song is an MP3 file, the metadata may be used to create or correct the ID3 tags stored in the MP3 file. In addition, the metadata may be used to generate new file names for the media files, create a new directory structure in the storage unit 32, or both, as will be apparent to one of ordinary skill in the art upon reading this disclosure.

After receiving the classifications from the archiving server 20, the archiving client 30 generates a media collection record defining the user's media collection (step 212). For each media file having known media content, the media collection record may include the GUID provided from the archiving server 20 identifying the media content of the media file, information identifying the CODEC or encoding algorithm used to encode the media file, and optionally one or more quality parameters. For each media file having unknown media content, the media collection record may include one or more identification parameters, information identifying the CODEC or encoding algorithm used to encode the media file, and one or more quality parameters. In this embodiment, the identification parameters for the unknown media files include the fingerprints generated for the unknown media files. In addition, the identification parameters may include metadata describing the media content of the media file, the file name of the media file, and the like. The archiving client 30 then provides the media collection record to the archiving server 20 (step 214).

At this point, the archiving server 20 classifies the CODEC or encoding algorithm for each media file as either known or unknown (step 216). Thereafter, the archiving server 20 identifies unique media files in the user's media collection and interacts with the archiving client 30 to upload the unique media files to the archiving server 20 (step 218). As discussed above, a unique media file is a media file having media content that is unknown to the archiving server 20, media content that is encoded with a CODEC or encoding algorithm that is unknown to the archiving server 20, or media content that is both unknown to the archiving server 20 or encoded with a CODEC or encoding algorithm that is unknown to the archiving server 20. The unique media files are stored in the unique media database 26.

The archiving server 20 then generates an archive of the user's media collection (step 220). More specifically, in one embodiment, a user archive record is generated. For each media file in the user's media collection having known media content encoded with a known CODEC or encoding algorithm, the archive record includes information identifying the media content of the media file, such as the GUID, information identifying the CODEC or encoding algorithm for the media file, and optionally one or more quality parameters. In addition, the archive record may include metadata describing the media content of the media file. For each unique media file in the user's media collection, the user archive record includes a reference to the unique media file in the unique media database 26, the identification parameters including the one or more fingerprints for the media file, information identifying the CODEC or encoding algorithm for the media file, and optionally one or more quality parameters. Alternatively, the unique media file may be stored within the archive record. The identification parameters and the information identifying the CODEC or encoding algorithm for each unique media file may thereafter be used by the archiving server 20 to determine whether to reclassify the unique media file when a new media file is added to the known media database 24 or a new CODEC or encoding algorithm is added to the CODEC library 28.

In this example, unknown media content may become known to the archiving server 20 (step 222). This occurs when a new media file is added to the known media database 24. The new media file includes the known media content and may be obtained from, for example, an original source such as a CD or DVD or an online service such as, but not limited to, Apple's iTunes. When previously unknown media content becomes known, the archiving server 20 operates to update the archive of the user's media collection (step 224). For example, when a new media file is added to the known media database 24, the archiving server 20 generates one or more fingerprints for the media content of the new media file and compares the fingerprints to the fingerprints for the unique media files in the user's media collection. If the media content of the new media file corresponds to the media content of a unique media file in the user's media collection, the archiving server 20 then determines whether the CODEC or encoding algorithm for the unique media file in the user's media collection is known. If not, the media file in the user's media collection remains classified as unique. If so, the archiving server 20 reclassifies the media file in the user's media collection as a non-unique media file, which is a media file having known media content encoded with a known CODEC or encoding algorithm. Once reclassified, the archive record is updated such that a GUID, information identifying the CODEC or encoding algorithm, and optionally one or more quality parameters are stored for the reclassified media file. The unique media file may then be removed from the unique media database 26.

In a similar fashion, an unknown CODEC or encoding algorithm may become known to the archiving server 20 by adding the CODEC or encoding algorithm to the CODEC library 28 (step 226). In response, the archiving server 20 updates the archive of the user's media collection (step 228). For example, if a particular unknown CODEC becomes known, the archiving server 20 determines whether there are unique media files in the user's media collection including known media content encoded with the previously unknown CODEC. If so, the archiving server 20 reclassifies the unique media files as non-unique media files, which are media files having known media content encoded with a known CODEC. Once reclassified, the archive record is updated such that a GUID, information identifying the CODEC or encoding algorithm, and optionally one or more quality parameters are stored for the reclassified media files. The unique media files may then be removed from the unique media database 26.

Figure 4:
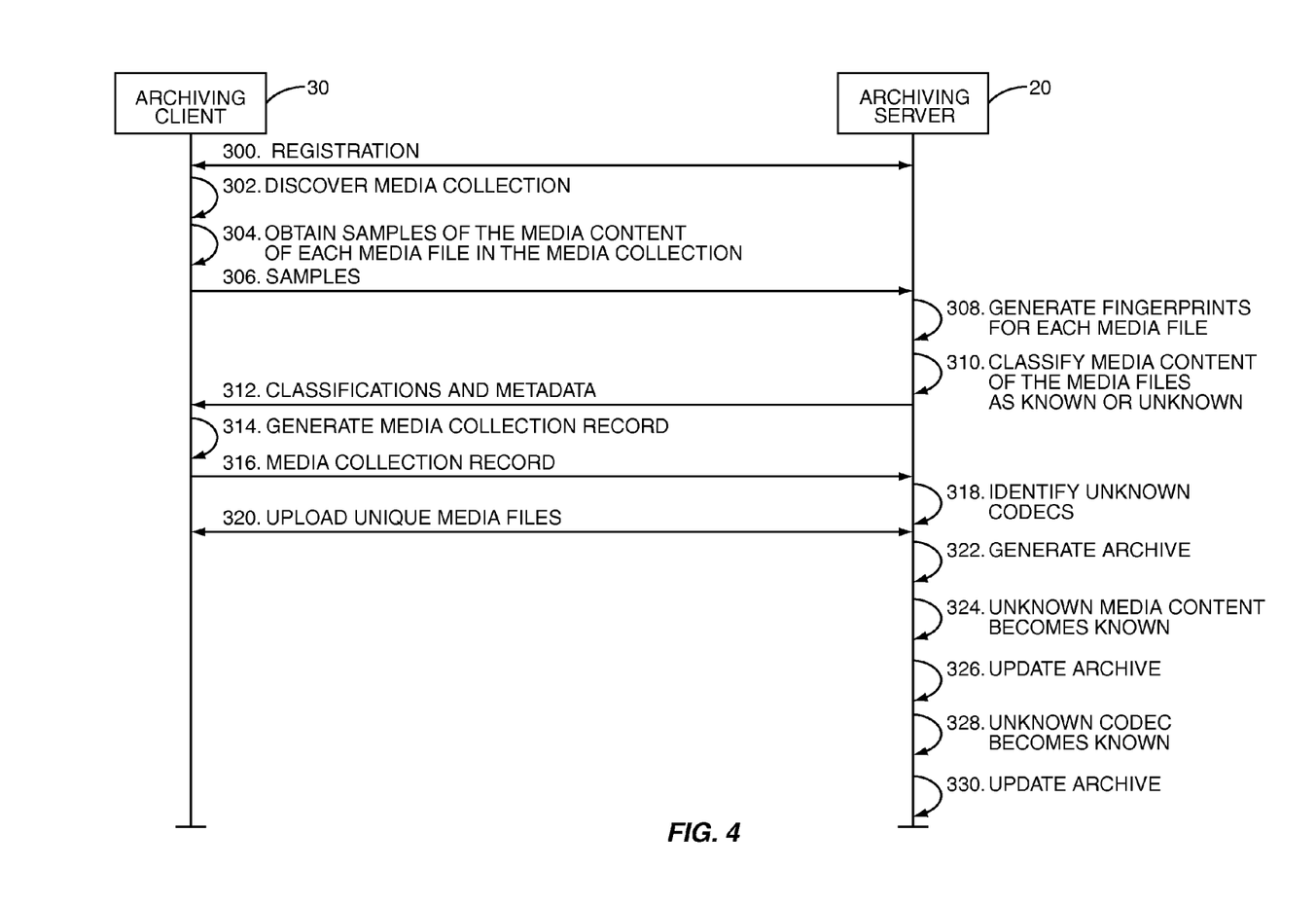
FIG. 4 is a more detailed illustration of the operation of the system of FIG. 1 according to a second embodiment of the present invention.

FIG. 4 is a more detailed illustration of the operation of the system 10 of FIG. 1 according to a second embodiment of the present invention and is substantially the same as that illustrated in FIG. 3. However, in this embodiment, the fingerprints for the media files in the user's media collection are generated by the archiving server 20 rather than the archiving client 30. More specifically, after registration and discovery of the user's media collection (steps 300 and 302), the archiving client 30 obtains one or more samples of the media content of each of the media files in the user's media collection (step 304). The samples are segments of the media content of the media files. The samples are then provided to the archiving server 20, wherein the archiving server 20 generates one or more fingerprints for each media file in the user's media collection based on the samples of the media content of the media files (steps 306 and 308). From this point, the process proceeds as described above with respect to FIG. 3 (steps 310-330). As such, the details are not repeated.

Figure 5:
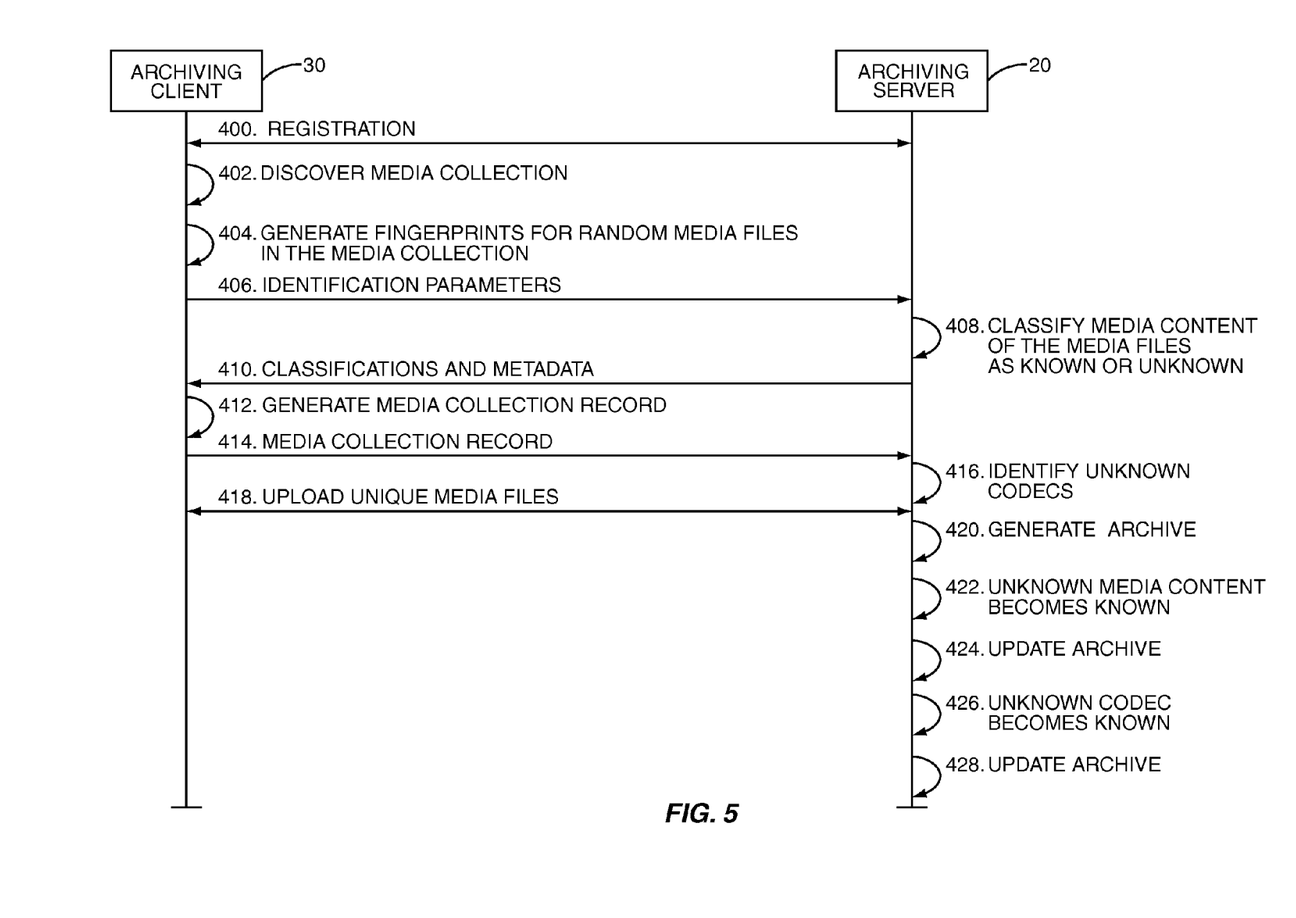
FIG. 5 is a more detailed illustration of the operation of the system of FIG. 1 according to a third embodiment of the present invention.

FIG. 5 is a more detailed illustration of the operation of the system 10 of FIG. 1 according to a third embodiment of the present invention and is similar to the embodiments illustrated in FIGS. 3 and 4. After registration and discovery of the user's media collection (steps 400 and 402), the archiving client 30 generates fingerprints for select ones of the media files in the user's media collection (step 404). Preferably, the select ones of the media files in the user's media collection are selected randomly. In this embodiment, the fingerprints are used, at least in part, to prevent spoofing of the archiving server 20 to obtain unauthorized copies of media files.

Next, one or more identification parameters for each media file in the user's media collection are provided to the archiving server 20 (step 406). For each media file having one or more fingerprints, the identification parameters include the fingerprints and optionally metadata, such as ID3 tags, describing the media content of the media file. For each media file not having a fingerprint, the identification parameters may include metadata, such as ID3 tags, describing the media content of the media file. In addition, the identification parameters for both media files having fingerprints and media files not having fingerprints may include a file name of the media file, directory name for the directory in which the media file is stored, and the like.

The archiving server 20 then classifies the media content of each media file as known or unknown based on the identification parameters (step 408). For each media file having one or more fingerprints, the archiving server 20 may compare the fingerprints of the media file to fingerprints of the media files in the known media database 24 to determine whether the media content of the media file is known or unknown. Alternatively, the archiving server 20 may identify the media files having one or more fingerprints based on the other identification parameters such as metadata describing the media content of the media files. Thereafter, for the media files having media content identified based on the other identification parameters, the fingerprints of the media files may be compared to fingerprints of the corresponding media files in the known media database 24 in order to validate that the media content of the media files in the user's media collection corresponds to the media content of the media files stored in the known media database 24. This may be particularly beneficial to prevent spoofing. More specifically, by comparing the fingerprints, the archiving server 20 prevents a user from obtaining an unauthorized copy of a media file by providing the metadata for a media file which they do not own to the archiving server 20 and then requesting that his or her media collection be restored. The fingerprints provide a method of verifying that the media content is in fact a part of the user's media collection.

For media files not having a fingerprint, the archiving server 20 determines whether the media content of the media files is known or unknown based on the identification parameters provided for the media files. More specifically, for each media file, the metadata describing the media content of the media file and optionally other information such as file name, directory name, and the like may be used by the archiving server 20 to determine whether the media content of the media file corresponds to the media content of one of the media files stored in the known media database 24.

Once the media content of each of the media files in the user's media collection is classified, the process proceeds as described above with respect to FIG. 3 (steps 410-428). As such, the details are not repeated.

Figure 6:
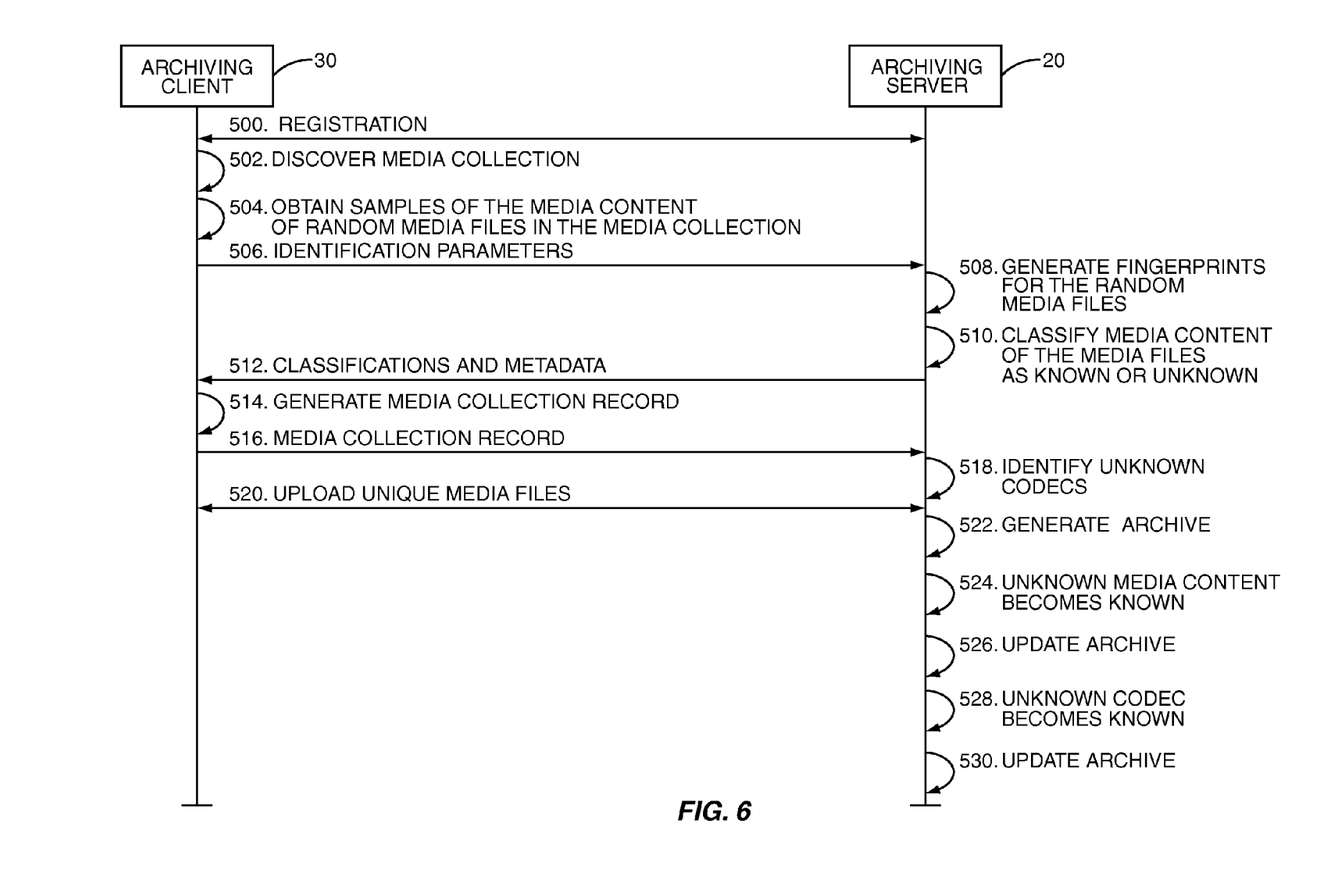
FIG. 6 is a more detailed illustration of the operation of the system of FIG. 1 according to a fourth embodiment of the present invention.

FIG. 6 is a more detailed illustration of the operation of the system 10 of FIG. 1 according to a fourth embodiment of the present invention and is substantially the same as that illustrated in FIG. 5. However, in this embodiment, the fingerprints for the select media files in the user's media collection are generated by the archiving server 20 rather than the archiving client 30. More specifically, after registration and discovery of the user's media collection (steps 500 and 502), the archiving client 30 obtains one or more samples of the media content of select ones of the media files in the user's media collection (step 504). The samples are segments of the media content of the media files. Preferably, the select ones of the media files in the user's media collection are selected at random. The samples are then provided to the archiving server 20, wherein the archiving server 20 generates one or more fingerprints for the select ones of the media files in the user's media collection based on the samples of the media content of the media files (steps 506 and 508). From this point, the process proceeds as described above with respect to FIG. 5 (steps 510-530). As such, the details are not repeated.

Figure 7:
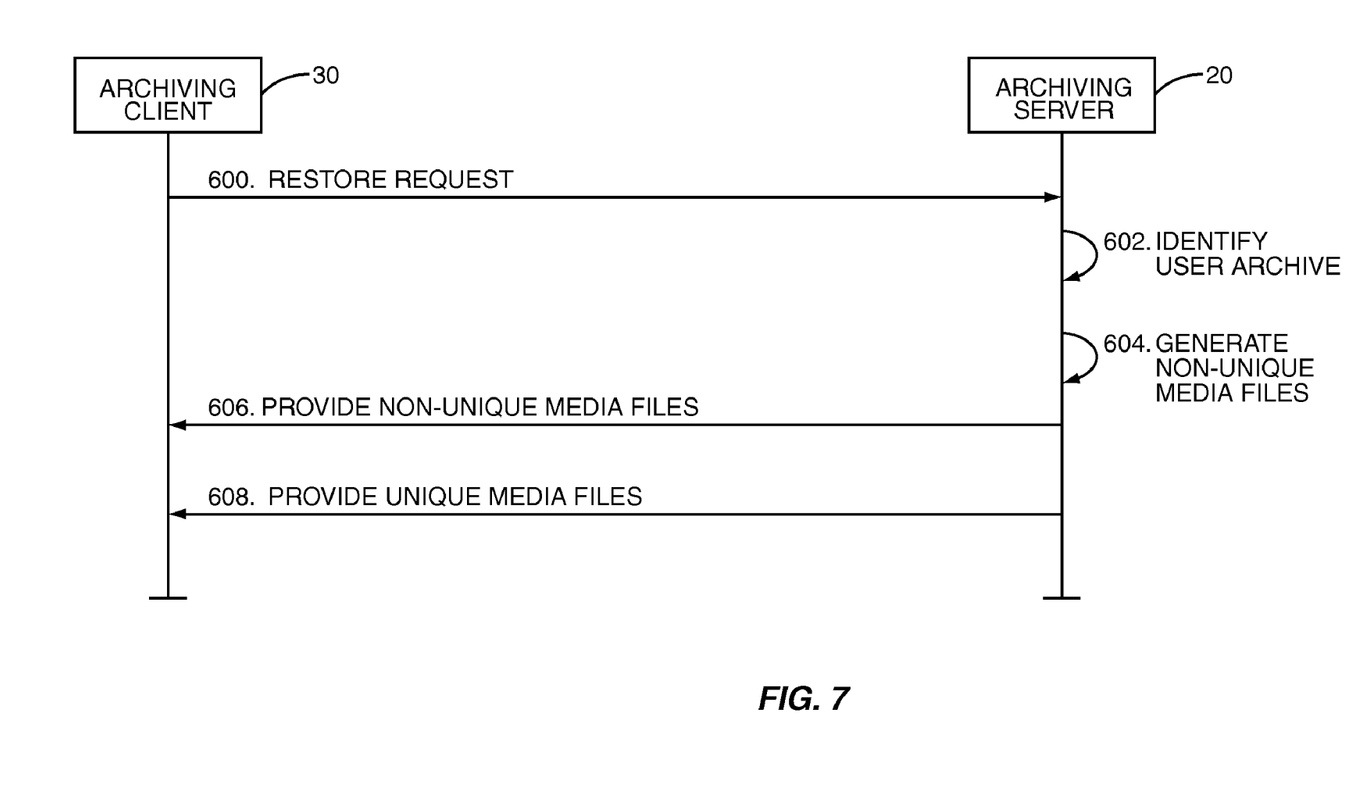
FIG. 7 illustrates the operation of the system of FIG. 1 to restore the user's media collection according to one embodiment of the present invention.

FIG. 7 illustrates the operation of the system 10 of FIG. 1 to restore the user's media collection to the user system 14 after a failure, such as a failure of the storage unit 32, at the user system 14 according to one embodiment of the present invention. In general, the restoration process begins when the archiving client 30 sends a restore request to the archiving server 20 (step 600). The restore request may include information identifying the user of the user system 14 and the archive of the user's media collection. In response to the request, the archiving server 20 identifies the archive of the user's media collection (step 602).

For media files in the user's media collection that include known media content encoded with a known CODEC or encoding algorithm, the archiving server 20 generates the media files using the corresponding high-quality reference media files from the known media database 24 and corresponding CODECs or encoding algorithms from the CODEC library 28 (step 604). In addition, the media files may be generated based on the quality parameters for the media files. More specifically, a particular media file in the user's media collection may be generated by encoding the corresponding high-quality reference media file with the associated CODEC or encoding algorithm according to the quality parameters for the media file. As a result, the generated media files are substantially, if not exactly, the same as the original media files in the user's media collection. Further, the user does not acquire higher quality versions of the media files than he or she originally had in his or her media collection.

The generated media files are provided to the archiving client 30 (step 606), and the unique media files in the user's media collection are obtained from the unique media database 26 and provided to the archiving client 30 (step 608). The archiving client 30 then stores the media files provided in steps 606 and 608 in the storage unit 32, thereby completing the restoration process.

In an alternative embodiment, rather than generating the non-unique media files in step 604 after receiving the restore request, the archiving server 20 may generate and store a number of versions of each of the media files in the known media database 24 prior to receiving a restore request. More specifically, in one embodiment, the archiving server 20 may generate a version of each of the media files in the known media database 24 for each known CODEC or encoding algorithm. The versions of the media files may be generated, for example, when the media files are added to the known media database 24. In another embodiment, the archiving server 20 may generate a version of each of the media files in the known media database 24 for each combination of quality parameters for each known CODEC or encoding algorithm. As a result, when a restore request is received, the archiving server 20 may obtain the non-unique media files from the known media database 24 rather than regenerating the needed versions of the media files in response to the request. Note that this alternative embodiment still provides substantial benefits over traditional archiving systems where a separate copy of the same version of a media file is stored in multiple users' archives. In this alternative embodiment, only a single copy of each version of a media file is stored, thereby substantially reducing the storage requirements of the archiving system 12.

The archiving system 12 may also place certain limitations on the restoration process. In one embodiment, the archiving system 12 may enable the user to authorize a limited number of user systems 14, 16 to which the user's media collection may be restored. Note that the user's media collection may be restored to any one of multiple authorized user systems. By limiting the number of user systems 14, 16 that may be authorized by the user, a rouge user is prevented from archiving a large collection and making his or her account information known to a large number of users, thereby allowing the users to obtain a copy of the user's media collection. The user systems 14, 16 that are authorized to perform the restoration process may be identified by, for example, a serial number of the Central Processing Units (CPUs) of the user systems 14, 16; the MAC address of an Ethernet adapted or other network interface associated with the user systems 14, 16; or the like.

To add additional security, the archiving system 12 may enable the user to change the user systems 14, 16 that are authorized to perform the restoration process only on an infrequent basis. For example, the archiving system 12 may enable the user to change only one of the authorized systems 14, 16 every six months. Again, this would be in support of preventing unauthorized duplication of the user's media collection.

Additionally or alternatively, the archiving system 12 may enable the user to change the authorized user systems 14, 16 more frequently if the user system 14, 16 being authorized is in close physical proximity to the user system 14, 16 being de-authorized. The locations of the user systems 14, 16 being authorized and de-authorized may be obtained based on, for example, the Internet Protocol (IP) addresses of the user systems 14, 16; Global Positioning System (GPS) receivers associated with the user systems 14, 16; or the like.

It should be noted that the processes of FIGS. 3-7 are exemplary and are not intended to limit the scope of the present invention. Numerous variations in the steps and the order in which the steps are performed will be apparent to one of ordinary skill in the art upon reading this disclosure.

Figure 8:
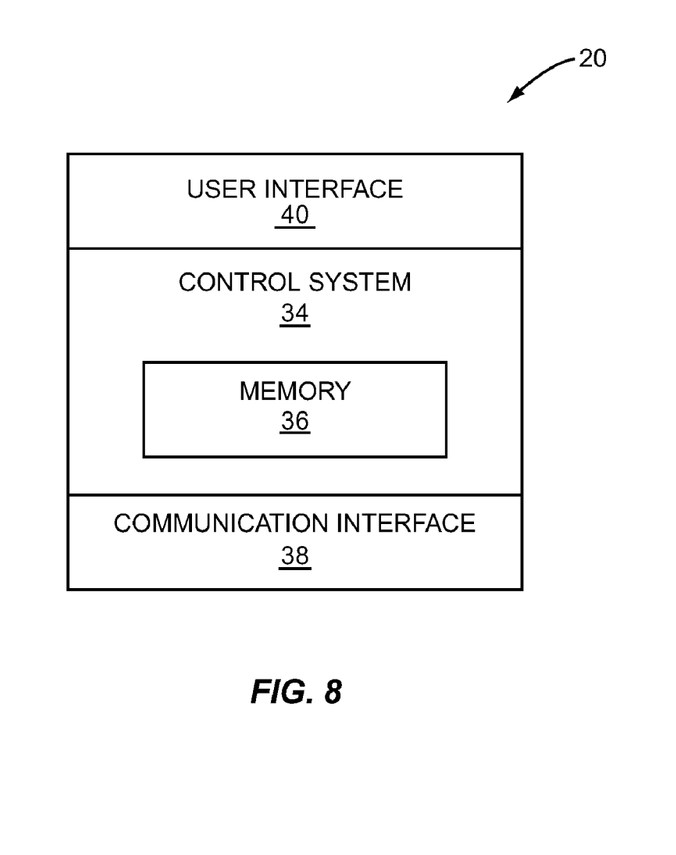
FIG. 8 is a block diagram of the archiving server of FIG. 1 according to one embodiment of the present invention.

FIG. 8 is a block diagram of an exemplary embodiment of the archiving server 20 according to one embodiment of the present invention. In general, the archiving server 20 includes a control system 34 having associated memory 36. The memory 36 includes software instructing the archiving server 20 to operate according to the present invention. In addition, the archiving server 20 includes a communication interface 38 communicatively coupling the archiving server 20 to the network 18 (FIG. 1). The archiving server 20 may also include a user interface 40 including components such as, but not limited to, a display, keyboard, and the like.

Figure 9:
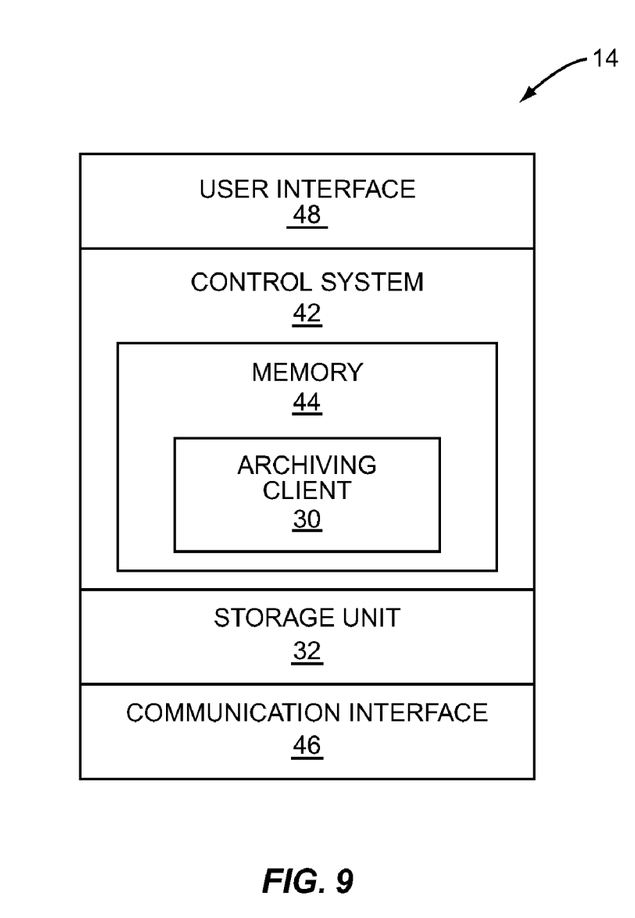
FIG. 9 is a block diagram of the user system of FIG. 1 according to one embodiment of the present invention.

FIG. 9 is a block diagram of an exemplary embodiment of the user system 14 according to one embodiment of the present invention. This discussion is equally applicable to the user system 16. In general, in this embodiment, the user system 14 includes a control system 42 having associated memory 44. In this embodiment, the archiving client 30 is implemented in software and is stored in the memory 44. The user system 14 also includes the storage unit 32, which may be, for example, a hard-disc drive. In addition, the user system 14 includes a communication interface 46 communicatively coupling the user system 14 to the network 18 (FIG. 1). The user system 14 may also include a user interface 48 including components such as, but not limited to, a display, speakers, one or more input devices, and the like.

Those skilled in the art will recognize improvements and modifications to the preferred embodiments of the present invention. All such improvements and modifications are considered within the scope of the concepts disclosed herein and the claims that follow.

What is claimed is:

1. A method for restoring a user's media collection from a central archiving system, the user's media collection comprising a plurality of media files having media content encoded with an encoding algorithm and stored on a user system, comprising:
- receiving a request from the user system to restore the user's media collection;
- accessing an archive record operating as an archive of the user's media collection, the archive record comprising, for each of the plurality of media files in the user's media collection, information identifying the media content for the media file, information identifying the encoding algorithm for the media file, and information identifying at least one quality parameter for the media file;
- recreating, at the central archiving system, each media file of the plurality of media files in the user's media collection by encoding, in a playable format, one of a plurality of reference media files stored at the central archiving system having media content corresponding to the media content identifies for the media file in the archive record using: one of a plurality of encoding algorithms corresponding to the encoding algorithm identified for the media file in the archive record and the at least one quality parameter for the media file identified in the archive record; and
- providing the recreated plurality of media files to the user system.

2. The method of claim 1 further comprising:
- authorizing a plurality of authorized user systems including the user system, the plurality of authorized user systems limited to a predetermined number of user systems;
- wherein restoring the user's media collection is limited to restoring the user's media collection to the plurality of authorized user systems.

3. The method of claim 2 further comprising:
- changing one of the plurality of authorized user systems to another user system; and
- limiting the step of changing the one of the plurality of authorized user systems to the other user system such that the step of changing cannot occur within a predetermined amount of time after authorizing one of the plurality of authorized user systems.

4. The method of claim 2 further comprising:
- changing one of the plurality of authorized user systems to another user system; and
- limiting the step of changing the one of the plurality of authorized user systems to the other user system such that the step of changing cannot occur unless the other user system is within a predetermined distance from the one of the plurality of authorized user systems.

5. The method of claim 1 wherein the user's media collection comprises at least one unique media file having media content that is unknown to the central archiving system or encoded using an encoding algorithm that is unknown to the central archiving system, and the method further comprises:
- identifying the at least one unique media file as a unique media file having either media content that is unknown to the central archiving system or media content encoded with an encoding algorithm that is unknown to the central archiving system based on the information identifying the media content and the information identifying the encoding algorithm for the at least one unique media file;
- obtaining the at least one unique media file from the user system; and
- storing the at least one unique media file in association with the archive record operating as the archive of the user's media collection.

6. The method of claim 5 wherein media content is unknown to the central archiving system if a reference media file corresponding to the media content is not stored by the central archiving system, and an encoding algorithm is unknown to the central archiving system if the encoding algorithm is not stored by the central archiving system.

7. The method of claim 6 wherein a new reference media file including new media content becomes known to the central archiving system and the method further comprises:
- identifying a media file from the at least one unique media file in the user's media collection including the new media content encoded with an encoding algorithm that is known to the central archiving system;
- updating the archive record to include information identifying the media content of the media file identified from the at least one unique media file in the user's media collection and information identifying the encoding algorithm for the media file identified from the at least one unique media file in the user's media collection; and
- removing the unique media file from storage at the central archiving system.

8. The method of claim 6 wherein a new encoding algorithm becomes known to the central archiving system and the method further comprises:
- identifying a media file from the at least one unique media file in the user's media collection including media content known to the central archiving system and encoded with the new encoding algorithm;
- updating the archive record to include information identifying the media content of the media file and information identifying the encoding algorithm for the media file; and
- removing the unique media file from storage at the central archiving system.

9. An archiving server for archiving a user's media collection including a plurality of media files having media content encoded with an encoding algorithm, comprising:
- a communication interface communicatively coupling the archiving server to a user system via a network, the user system storing the plurality of media files; and
- a control system associated with the communication interface and adapted to:
  - receive a request from the user system to restore the user's media collection;
  - access an archive record operating as an archive of the user's media collection, the archive record comprising, for each of the plurality of media files in the user's media collection, information identifying the media content for the media file, information identifying the encoding algorithm for the media file, and information identifying at least one quality parameter for the media file;
  - recreate, at the archiving server, each media file of the plurality of media files in the user's media collection by encoding, in a playable format, one of a plurality of reference media files stored at the archiving server having media content corresponding to the media content identified for the media file in the archive record using: one of a plurality of encoding algorithms corresponding to the encoding algorithm identified for the media file in the archive record and the at least one quality parameter for the media file identified in the archive record; and
  - provide the recreated plurality of media files to the user system.

10. The archiving server of claim 9 wherein the control system is further adapted to:

authorize a plurality of authorized user systems including the user system, the plurality of authorized user systems limited to a predetermined number of user systems;

wherein restoring the user's media collection is limited to restoring the user's media collection to the plurality of authorized user systems.

11. The archiving server of claim 10 wherein the control system is further adapted to:

change one of the plurality of authorized user systems to another user system; and limit changing of the one of the plurality of authorized user systems to the other user system such that the changing cannot occur within a predetermined amount of time after authorizing one of the plurality of authorized user systems.

12. The archiving server of claim 10 wherein the control system is further adapted to:

change one of the plurality of authorized user systems to another user system; and limit changing of the one of the plurality of authorized user systems to the other user system such that the changing cannot occur unless the other user system is within a predetermined distance from the one of the plurality of authorized user systems.

13. The archiving server of claim 9 wherein the user's media collection comprises at least one unique media file having media content that is unknown to the archiving server or encoded using an encoding algorithm that is unknown to the archiving server, and the control system is further adapted to:

identify the at least one unique media file as a unique media file having either media content that is unknown to the archiving server or media content encoded with an encoding algorithm that is unknown to the archiving server based on the information identifying the media content and the information identifying the encoding algorithm for the at least one unique media file;

obtaining the at least one unique media file from the user system; and storing the at least one unique media file in association with the archive record operating as the archive of the user's media collection.

14. The archiving server of claim 13 wherein media content is unknown to the archiving server if a reference media file corresponding to the media content is not stored by the archiving server, and an encoding algorithm is unknown to the archiving server if the encoding algorithm is not stored by the archiving server.

15. The archiving server of claim 14 wherein a new reference media file including new media content becomes known to the archiving server and the control system is further adapted to:

identify a media file from the at least one unique media file in the user's media collection including the new media content encoded with an encoding algorithm that is known to the archiving server;

updating the archive record to include information identifying the media content of the media file identified from the at least one unique media file in the user's media collection and information identifying the encoding algorithm for the media file identified from the at least one unique media file in the user's media collection; and removing the unique media file from storage at the archiving server.

16. The method of claim 14 wherein a new encoding algorithm becomes known to the archiving server and the control system is further adapted to:

identify a media file from the at least one unique media file in the user's media collection including media content known to the archiving server and encoded with the new encoding algorithm;

update the archive record to include information identifying the media content of the media file and information identifying the encoding algorithm for the media file; and remove the unique media file from storage at the archiving server.

* * * * *